INVENTORS
NORMAN E. MARCUM
EMMETT R. QUADY
MANFRED WILDMANN

BY John A Duffy

AGENT

INVENTORS
NORMAN E. MARCUM
EMMETT R. QUADY
MANFRED WILDMANN
BY
John A. Duffy
AGENT INVENTORS
NORMAN E. MARCUM
EMMETT R. QUADY
MANFRED WILDMANN
BY
John A. Duffy
AGENT

MAGNETIC DISC DATA STORAGE DEVICE

Filed Aug. 3, 1959 4 Sheets-Sheet 4

INVENTORS
NORMAN E. MARCUM
EMMETT R. QUADY
MANFRED WILDMANN
BY John A. Duffy
AGENT 3,122,727
Patented Feb. 25, 1964

3,122,727
MAGNETIC DISC DATA STORAGE DEVICE

Norman E. Marcum, La Habra, Emmett R. Quady, South Pasadena, and Manfred Wildmann, Buena Park, Calif., assignors to North American Aviation, Inc.

Filed Aug. 3, 1959, Ser. No. 831,369
3 Claims. (Cl. 340—174.1)

This invention relates to a magnetic disc data storage device and more particularly to a magnetic disc recorder for storing and reproducing electrical signals.

A large volume data storage device which will function satisfactorily under adverse environmental conditions has long been needed in the data processing and digital computer art. In addition to the adverse environmental requirement, there is often a need for a light-weight magnetic storage device which will store a large amount of arithmetic words in a small package.

Magnetic storage devices of the prior art have proved unsatisfactory where the computer is utilized under adverse environmental conditions and where a minimum sized computer is needed to store a maximum number of arithmetic words. More particularly, devices of the prior art have been unable to store or record a large amount of arithmetic information on a small recording surface without becoming mechanically cumbersome and complicated. In order to record a large amount of arithmetic information on a small recording surface, extremely small mechanical tolerances are required. Devices of the prior art failed to obtain a suitable space relationship between the magnetic storage disc and the recording device to meet these requirements. Misalignment between the storage disc and the recording device known as a headplate often results in amplitude and frequency modulation of the electrical signals received from the recorder. This produces unreliable and false information from the magnetic storage device. Additionally, magnetic recorders of the prior art were necessarily large in order to handle the large amount of information required.

The device of this invention provides a magnetic disc recorder of simple mechanical structure which functions in a versatile and efficient manner under adverse environmental conditions and is capable of handling a large amount of electrical information in a small package design. Simplified design and easy construction provide a device which insures the required mechanical alignment between the recording disc and the reading and writing structure. A precision space relationship between the relatively moving parts is obtained. Close mechanical alignment is provided between the disc recorder and magnetic heads by structure which resists uneven bearing deflection caused by acceleration forces thereon. In one preferred embodiment a combination of an autolubricated radial spin gas bearing formed between a shaft and a disc rotor and two gas autolubricated thrust bearing surfaces formed between the disc and a pair of recording surfaces provides a new and useful magnetic recording device. A new and simpler construction is provided by having two headplates disposed opposite the recording disc. Full utilization of the moving recording disc surface is provided by the application of magnetic recording coding on both sides of the disc.

It is therefore an object of this invention to provide an improved magnetic disc data storage device.

It is another object of this invention to provide a disc recorder having a minimum radial and thrust deflection between the storage disc and the headplates.

It is a further object of this invention to provide a magnetic disc recorder of close mechanical and electrical alignment between the magnetic storage disc and the magnetic heads.

It is a still further object of this invention to provide a disc recorder relatively insensitive to acceleration loads thereon.

It is another object of this invention to provide a disc recorder that is economical in construction and requires a minimum of precision construction.

It is a further object of this invention to provide a combination of thrust and radial bearings for magnetic disc recorders which is economical in construction and allows for simple but precise fabrication.

It is another object of this invention to provide a combination of radial and thrust bearings between a recording disc and reading and writing structure to cause the combination to be relatively insensitive to accelerations.

It is still another object of this invention to provide a combination of radial and thrust bearings in a magnetic disc recorder to cause the combination to have no mechanical wear during continuous operation.

Other objects of invention will become apparent from the following description taken in connection with the accompanying drawings in which.

The device of this invention utilizes the advantageous properties of an autolubricated or viscous shear bearing. A viscous shear or boundary lubricated air bearing can be produced by a flat plate spinning in close proximity (about 0.001 of an inch) to a second plate which is relieved to form slanted or stepped depressions. The depressions are situated so that the spinning plate causes a piling up and shearing of air at the shoulders of the depressions or troughs in the other plate. This viscous shear or boundary lubricated air bearing is self-lubricated with air and is not to be confused with those bearings utilizing air under pressure or air turbulence, the pumping of air, or centrifugal pumping of fluids which are often used to provide bearing lubrication. The prior art requires increased air or fluid pressure to be applied between thrust surfaces by some impeller or pump structure. Applicants require no such impeller or pump and utilizes a thin film of air as a lubricant. Therefore, as may be expected, the device of the invention works satisfactorily in rarified atmosphere.

Figure 1:
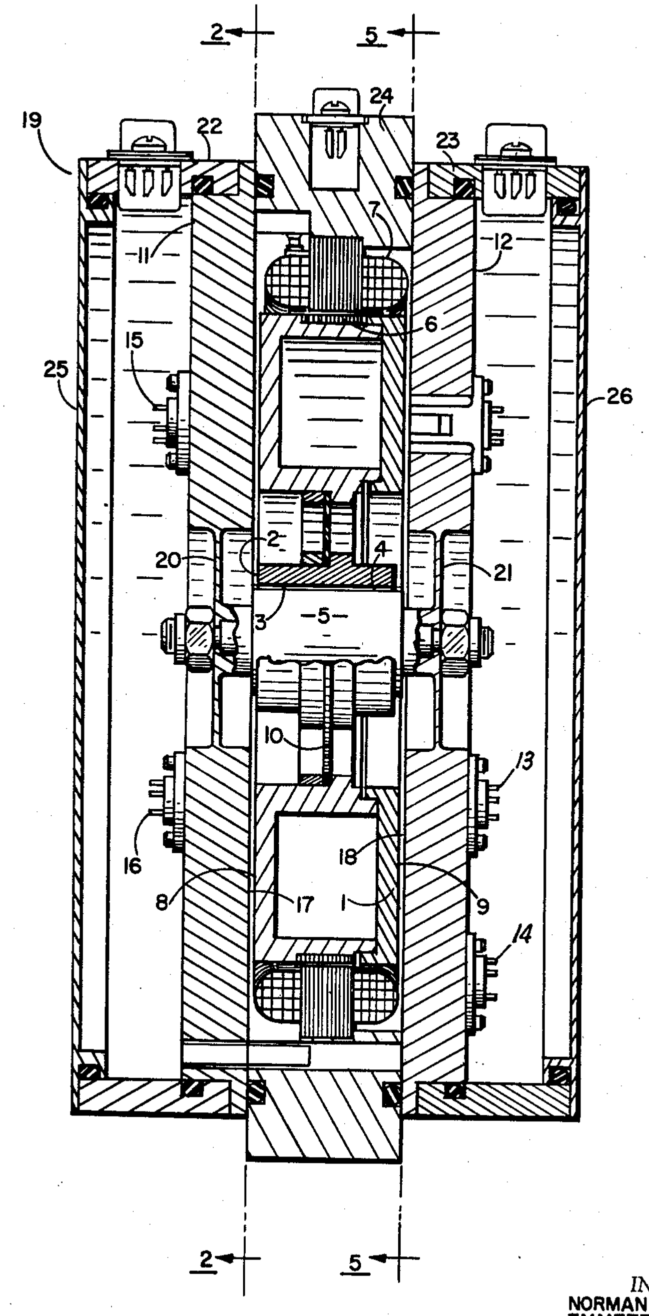
FIG. 1 is a cross-section of the preferred embodiment of this invention.

Referring now to FIG. 1 of the preferred embodiment of the device, there is shown in cross-section the magnetic data storage device of this invention. Rotor 1 has its inner portion or hub 2 provided with a radial bearing surface or journal 3 fitted to rotate relative to radial bearing surface 4 of shaft 5. Clearance between bearing surfaces 3 and 4 is determined by the amount of the load and the speed of rotor 1. For a typical operation the clearance may be from 75 to 100 microinches. In this cap an autolubricated radial spin gas bearing action occurs during the rotation of rotor 1 about shaft 5. Suitable motor rotor rings 6 are disposed on the periphery or outer portion of rotor 1 opposite stator 7 which forms a motor to rotate rotor 1 about shaft 5. Simplicity and compactness are achieved by having the rotor rings 6 forming a part of rotor 1. Rotor 1 has retentive magnetic materials 8 and 9 each cast in an annulus on its opposite exterior faces. Rotor 1 is suitably necked down to form a flexible web 10 between the inner portion or hub 2 and the outer periphery or rim of the disc. Web 10 is rigidly attached to hub 2 and rotates therewith. A pair of mutually spaced coaxial headplates 11 and 12 are rigidly interconnected by non-rotating shaft 5. Each of headplates 11 and 12 supports a number of recording heads, for example 13 and 14, and 15 and 16, respectively, located thereon on each recording face 17 and 18. Recording face 17 of headplate 11 is located in close proximity to magnetic face 8 of disc 1. Recording face 18 of headplate 12 is located in close proximity to magnetic face 9 of disc 1. Thus disc 1 is rotatably mounted on shaft 5 between headplates 11 and 12. In order to operate with the desired mechanical and electrical characteristics it is necessary that the recording faces of headplates 11 and 12 be in a closely spaced relationship with magnetic faces 8 and 9 of disc 1. A boundary lubricated viscous shear thrust bearing between disc 1 and headplates 11 and 12 is developed to acquire a close proximity. The gap between magnetic face 8 and recording face 17, for example, may be on the order of .0001 of an inch. Headplates 11 and 12 are rigidly attached at their outer diameter to a suitable main housing 19. Each of headplates 11 and 12 has a flexible diaphragm means 20 and 21 attaching their inner diameter to the outer diameter of shaft 5. Diaphragms 20 and 21 may consist of a thin fiberglass disc having its inner diameter suitably attached to shaft 5 and its outer diameter attached to the inner diameter of headplate 12, for example. Main housing 19 has an outer portion 22 rigidly attached to headplate 11, an outer portion 23 rigidly attached to headplate 12, and a middle portion 24 rigidly attached to stator 7. Plates 25 and 26 suitably enclose the headplates 11 and 12 in main housing 14.

In operation when the motor reaches a predetermined speed a combination autolubricated radial spin gas bearing and autolubricated thrust gas bearing supports rotor 1 relative to shaft 5 and head plates 11 and 12. An automatic boundary lubricated gas shear thrust bearing is developed between magnetic face 8 and recording face 17 and between magnetic face 9 and recording face 16. The manner in which the autolubricated thrust bearing is developed is more fully described in Patent Number 2,899,260 by William A. Farrand et al., titled Magnetic Disc Recorder. An autolubricated radial spin gas bearing action is developed between bearing surface 3 on disc 1 and bearing surface 4 on shaft 5. The manner in which the gas bearing is developed is more fully described in the co-pending Patent 3,048,043 by John M. Slater et al., titled Gas Bearing Gyroscope.

The embodiment of the magnetic storage device of this invention illustrated in FIG. 1 provides a combination of an autolubricated radial spin gas bearing formed between shaft 5 and disc 1 and two gas autolubricated thrust bearings formed respectively between headplate 11 and face 8 of disc 1 and headplate 12 and the other face 9 of disc 1. The radial bearing action between the smooth hard bearing surface 4 of shaft 5 and bearing surface 3 of disc 1 is created by the rotation of disc 1 with the supporting pressure of the air which is generated when the air is dragged into the gap between surfaces 3 and 4. By reason of the configuration of the thrust bearing surfaces between headplates 11 and 12 and disc 1, to be fully described later, the gas lubricated thrust bearing develops a supporting force between disc 1 and headplates 11 and 12 in a direction normal to surfaces 11 and 12. The radial air bearing created between shaft 5 and disc 1 develops a supporting force in the direction normal to surfaces 3 and 4. Thus it may be seen that any tendency of misalignment between the parts of the storage device caused, for example, by acceleration forces when the recorder is mounted in an airplane will be a minimum and immediately compensated for by the radial and thrust air bearings. For example, when disc 1 is rotating about shaft 5 relative to headplates 11 and 12 a deflection of disc 1 with respect to shaft 5 in a radial direction, caused by acceleration under load or the high speed of the rotating disc, causes a deflection between bearing surfaces 3 and 4. Due to the inherent stiffness of the radial bearing developed between surfaces 3 and 4, and the action in the operation of the air bearing, as fully described in the co-pending application to John M. Slater et al. previously noted, the higher air pressure developed in the bearing tends to decrease the radial deflection between disc 1 and shaft 5. Since headplates 11 and 12 are rigidly attached to shaft 5, a radial deflection between headplates 11 and 12 and the magnetic material faces 8 and 9 of disc 1 is compensated for by the radial air bearing. Similarly, the thrust bearings developed between headplate 11 and magnetic face 8 of disc 1 and headplate 12 and magnetic face 9 of disc 1 resist any tendency for deflection in an axial direction between disc 1 and headplates 11 and 12.

It is to be noted that full utilization of the surface of disc 1 is provided by the application of magnetic recording coding on both sides of the disc. This feature allows a pronounced increase in the amount of memory storage for a given volume over disc recorders of the prior art. In fact, the storage facilities are approximately doubled by the use of two headplates and one disc. The shaft eccentricity is limited only by the clearance of the air bearing between bearing surfaces 3 and 4. Due to the inherent design of an air bearing this clearance may be made appreciably smaller for larger loads than prior bearings. Additionally, the bearing surfaces of the radial air bearing between disc 1 and shaft 2 can be maintained to a predetermined clearance because an air bearing has no wear in operation. Utilizing headplates 11 and 12 having disc 1 located therebetween and held in axial position by the autolubricated thrust bearings developed between its two faces 8, 9 and headplates 11 and 12 eliminates the need of an externally applied force to bias the disc against the thrust bearing surface of the headplate which is required in prior disc recorders. Flexible diaphragm means 20 and 21 securing headplates 11 and 12 to shaft 5 tend to reduce further any misalignment in the recorder.

Figure 2:
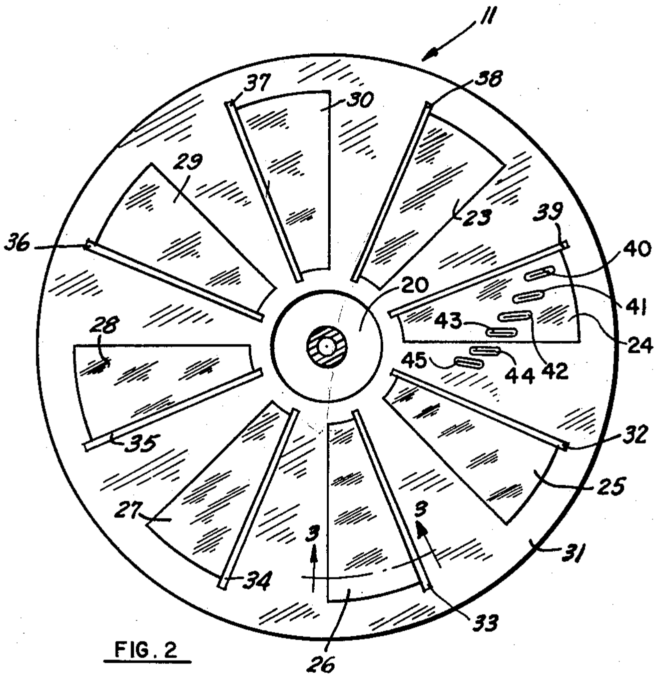
FIG. 2 is a view of one form of headplate from the underside, line 2—2 of FIG. 1.

Turning now to FIG. 2, there is shown a view of headplate 11 looking from the underside taken at line 2—2 of FIG. 1. In this view, as seen from the underside of the headplate, a plurality of troughs or steps 23, 24, 25, 26, 27, 28, 29 and 30 are cut into or otherwise formed below the surface 31 of the headplate 11 and over a major portion of the area thereof as illustrated. In conjunction with each of the steps 23–30 is an associated groove or trench, also shown in FIG. 2 and numbered 32, 33, 34, 35, 36, 37, 38 and 39. These grooves are somewhat deeper than the steps 23–30 and provide inlet paths and allow air to be drawn into the negative pressure area of the boundary lubricated air bearing. Communication is allowed with the external atmosphere by extending grooves 32–39 radially beyond the circumference of the face 8 of rotor 1.

Figure 3:
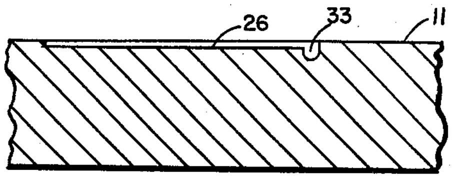
FIG. 3 is a partial cross-section of the headplate shown in FIG. 2.

The steps and grooves formed in the headplate 11 are further illustrated in the cross-section view of FIG. 3 taken along the surface 3—3 of FIG. 2. Step 26 is representative of each of the steps 23–30 and has a uniform depth as shown. Groove 33 is representative of each of the grooves 32–39 and is located along one side of the step 26 and extends deeper into the headplate than the step 26. In FIG. 3 the step and groove are of exaggerated dimensions for clarity. The depth of each step is typically .0004 inch while the depth and diameter of the circular groove 33 is typically .015 inch.

The headplate shown in FIGS. 2 and 3 forms an air bearing with the face 8 of rotor 1 in a manner similar to that previously described in co-pending application entitled Magnetic Disc Recorder by William A. Farrand et al. This headplate construction is quite satisfactory for high operational speeds in the order of 3500 to 12,000 revolutions per minute.

Recording and reading magnetic heads such as 40, 41, 42, 43, 44, and 45 may be located around the underside of headplate 11 flush with the surface thereof. It will be understood that the number and arrangement of heads is a matter of choice and is limited by the physical dimensions of the heads themselves.

Headplate 12, located on the other side of rotor 1, is of identical construction to that of headplate 11.

While the illustrated discs and heads are planar, it will be readily appreciated that there may be utilized other configurations such as, for example, semi-spheres having spherical surfaces everywhere equidistant and mutually spaced as previously described.

Figure 4:
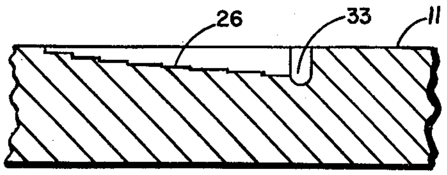
FIG. 4 is a partial cross-section of a modified form of the headplate shown in FIG. 3.

FIG. 4 illustrates an alternative embodiment of the headplate shown in FIG. 2 as cut by the surface 3—3. The steps 23–30 of FIG. 2 are illustrated in FIG. 4 as forming in fact a series of steps.

Figure 5:
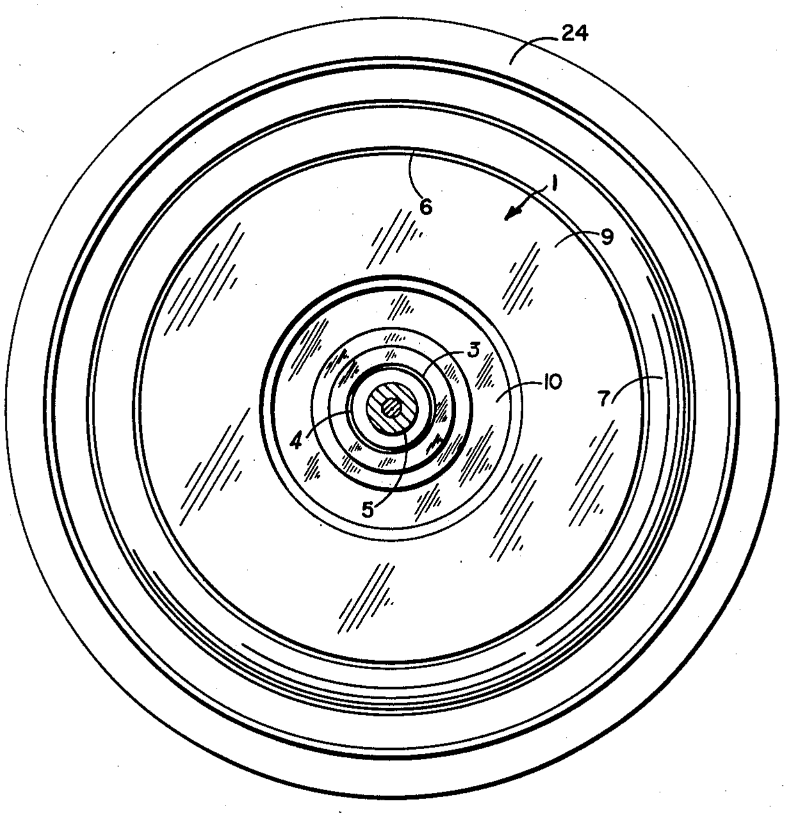
FIG. 5 is a view of the recording disc from the recorded side, line 5—5 of FIG. 1.

In FIG. 5 there is shown a view of the recording disc 1 of FIG. 1 from the recorded side, line 5—5 of FIG. 1. In this view the bearing surfaces 3 and 4 form an automatic lubricated air bearing between shaft 5 and disc 1. As previously noted, the position of the outer surface of shaft 5 and the inner surface of disc 1 is determined by the amount of load on the bearing. This may depend, for example, on the speed of disc 1 and the weight. In a preferred embodiment, disc 1 is constructed of aluminum to lighten the weight thereon. The gap between the periphery of disc 1 having rotor rings 6 located thereon and stator 7 is determined by the design of the motor well known in the electrical motor art.

Figure 6:
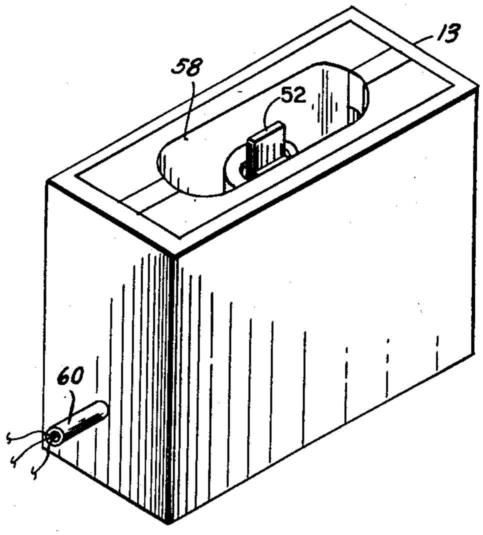
FIG. 6 is an enlarged perspective view of a magnetic write head used in the recorder of FIG. 1.
Figure 7:
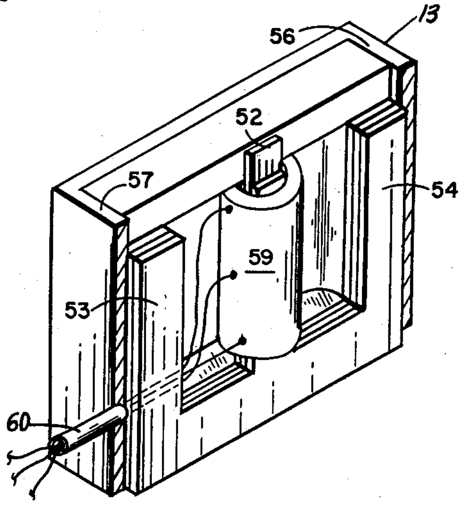
FIG. 7 is a partial cross-section of a record head which is similar to that in FIG. 6.

A magnetic write head which has been developed for use in this device is that indicated in FIG. 6. FIG. 7 shows a read head of similar construction. Both heads include a pole piece 52 as indicated in FIG. 6 constructed of three laminations, each 0.001 inch thick. The pole piece should be of high permeability material. This is commonly nickel and iron, or nickel, iron, and cobalt alloy, such as Supermalloy. The opposite limbs 53 and 54 of the pole piece are held between sections 56 and 57 of ferrite material having a hollow center portion 58 through which the center limb of pole piece 52 extends. A ferrite and ceramic material having high initial permeability and high bulk resistivity is satisfactory for the construction of sections 56 and 57. A coil of wire 59 is wound around the center limb of pole piece 52 and has a center tap and a tap at each end. A shield 60 is provided for the connections to coil 59. Into the hollow portion 58 in the ferrite sections 56 and 57 is deposited a plastic dielectric mixed with a filler, such as an epoxy resin mixed with aluminum oxide powder. This material provides rigidity and matches its expansion to the expansion of the surrounding materials with applied heat. It is noted that the center lamination of the pole piece 52 extends above coil 59 while the remaining two laminations terminate approximately flush with the uppermost end of coil 59. Also, the limbs 53 and 54 terminate below the face of ferrite sections 56 and 57. In this manner, the return magnetic path is the whole face of sections 56 and 57. The heads of FIGS. 6 and 7 differ in the spacing at the face of the head between the ferrite sections and the pole piece 52. In FIG. 5, the read head, this spacing is about 0.002 of an inch.

Figure 9:
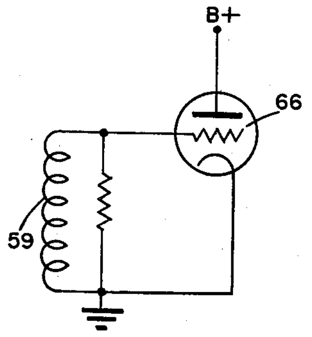
FIGS. 8 and 9 illustrate typical head connections to an amplifier.
Figure 8:
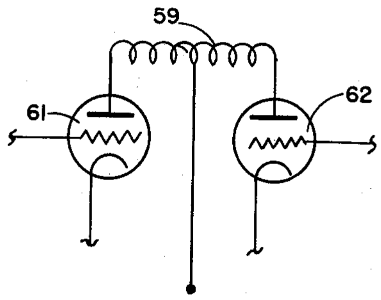

FIG. 8 indicates how the three connections to the write head would be utilized in recording upon the magnetic disc, the center tap of coil 59 being connected to the B+ supply and each end of the winding being connected to the plate of respective driver tubes 61 and 62. A phantom center tap can be substituted in this instance for an actual center tap. FIG. 9 indicates how the head of FIG. 8 is utilized as a read head. The center tap is unused and one end of the coil is connected to ground. The other end is connected to the grid of a detector tube 66.

Figure 10:
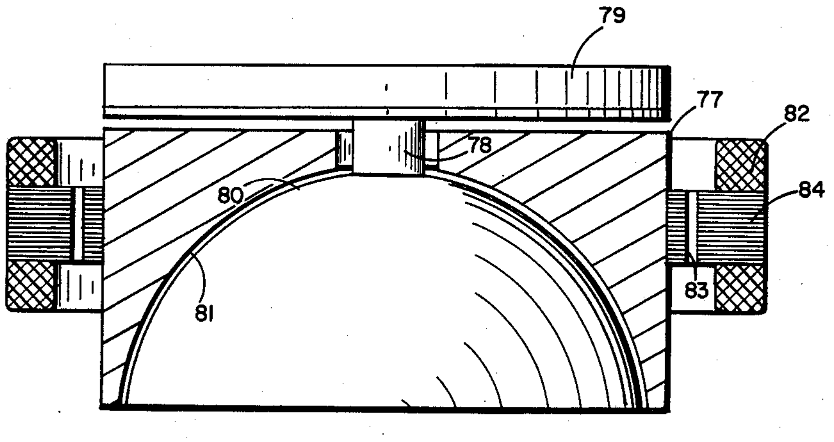
FIG. 10 is a cross-sectional view of an alternative embodiment of the recorder of this invention.

Turning now to FIG. 10 there is shown a cross-sectional view of a recording disc of an alternative embodiment of this invention. In FIG. 10 a spherical type combined radial and thrust bearing is formed between disc 77, shaft 78, and headplate 79. The bearing surface 80 of the spherical bearing is placed contiguous to the bearing surface 81 of disc 77. The rotation of disc 77 about shaft 78 provided by motor 82 having a suitable stator 83 and rotor rings 84 attached to disc 77 results in the development of an air bearing between surfaces 80 and 81. The materials used in the radial bearing developed in FIG. 10 may be, for example, surfaces achieved by chromium or nickel plating to provide a hard smooth finish. The use of a spherical bearing of the type disclosed in FIG. 10 results in the recording on only one face of disc 77 and facilitates the manufacturing of the data recording device.

The use in a magnetic disc data storage device of the combination of autolubricated gas radial and thrust bearings disclosed herein improves the operation of magnetic recorders as compared with prior recorders utilizing ball bearings and the like.

Although this invention has been described and illustrated in detail, it is to be clearly understood that the same is by way of illustration and example only and is not to be taken by way of limitation, the spirit and scope of this invention being limited only by the terms of the appended claims.

We claim:

1. In a magnetic recorder, a shaft, a pair of headplates, at least one magnetic head disposed in each of said headplates, a disc coaxial with said shaft and rotatably mounted with respect thereto between said headplates, a radial self-lubricated viscous shear gas bearing surface formed on said shaft and a radial bearing surface formed with said disc, the radial bearing surface of said disc being formed in juxtaposed concentric relation with said shaft surface, said disc having a magnetizable medium on both faces thereof and adapted to assume a position in close proximity to said headplates, means for developing a self-lubricated viscous shear gas bearing between said headplates and said disc, and means for rotating said disc relative to said headplates.

2. In a magnetic recorder, first and second spaced-apart coaxial headplates having parallel planar faces normal to their common axis, a stationary shaft interconnecting said headplates, a disc rotatably mounted on said shaft between said headplates, said shaft being formed with a radial gas bearing surface thereon and said disc being formed with a radial gas bearing surface in juxtaposed concentric relation with said shaft surface, each of said headplates having at least one magnetic head disposed in said headplate on one face thereof, said disc having magnetizable mediums on both faces thereof and adapted to assume a position in which one magnetizable face of said disc is in close proximity with said one face of said first headplate and the other magnetizable face of said disc is in close proximity with said one face of said second headplate, means for rotating said disc relative to said headplates, and means for developing a self-lubricated viscous shear gas bearing between said one face of said first and second headplates and both faces of said disc.

3. In a magnetic recorder, a shaft having a circularly cylindrical outer bearing surface, a pair of spaced-apart coaxial headplates having facing coaxial planar faces perpendicular to their common axis, said shaft resiliently interconnecting said headplates along their said common axis, a disc, means for rotatably mounting said disc on said shaft between said headplates, including a radial bearing surface formed on said shaft and a radial bearing surface formed with said disc, the radial bearing surface of said disc being formed in juxtaposed concentric relation with said shaft surface, said radial bearing surfaces forming a self-lubricated viscous shear gas bearing and said magnetizable faces of said disc and their adjacent said headplates forming self-lubricated viscous shear gas thrust bearings, each of said headplates having at least one magnetic head disposed in said headplate on one of said planar faces thereof, said disc having magnetizable mediums on both faces thereof and adapted to assume a position in which one magnetizable face of said disc is in close proximity with said one face of one of said headplates and the other magnetizable face of said disc is in close proximity with said one face of the other of said headplates.

References Cited in the file of this patent

UNITED STATES PATENTS

| | | |
|---|---|---|
| 850,036 | Morin | Apr. 9, 1907 |
| 2,690,913 | Rabinow | Oct. 5, 1954 |
| 2,899,260 | Farrand et al. | Aug. 11, 1959 |
| 2,908,541 | Fomenko | Oct. 13, 1959 |

FOREIGN PATENTS

| | | |
|---|---|---|
| 201,333 | Australia | Jan. 10, 1955 |
| 850,766 | Great Britain | Oct. 5, 1960 |

OTHER REFERENCES

"An Air-Floating Disk Magnetic Memory Unit," by W. A. Farrand, Autonetics, a Div. of North American Aviation, Inc., Aug. 21, 1957.